US011303931B2

United States Patent
Lee et al.

(10) Patent No.: US 11,303,931 B2
(45) Date of Patent: Apr. 12, 2022

(54) METHOD AND APPARATUS FOR PROCESSING PROJECTION-BASED FRAME HAVING PROJECTION FACES PACKED IN HEMISPHERE CUBEMAP PROJECTION LAYOUT WITH FACE PACKING CONSTRAINTS

(71) Applicant: MEDIATEK INC., Hsin-Chu (TW)

(72) Inventors: Ya-Hsuan Lee, Hsinchu (TW); Jian-Liang Lin, Hsinchu (TW)

(73) Assignee: MEDIATEK INC., Hsin-Chu (TW)

( * ) Notice: Subject to any disclaimer, the term of this patent is extended or adjusted under 35 U.S.C. 154(b) by 0 days.

(21) Appl. No.: 17/177,148

(22) Filed: Feb. 16, 2021

(65) Prior Publication Data

US 2021/0392374 A1    Dec. 16, 2021

Related U.S. Application Data

(60) Provisional application No. 63/037,064, filed on Jun. 10, 2020.

(51) Int. Cl.
*H04N 19/597* (2014.01)
*H04N 19/70* (2014.01)
(52) U.S. Cl.
CPC ........... *H04N 19/597* (2014.11); *H04N 19/70* (2014.11)
(58) Field of Classification Search
None
See application file for complete search history.

(56) References Cited

U.S. PATENT DOCUMENTS

| 2017/0347026 A1* | 11/2017 | Hannuksela | H04L 65/4084 |
| 2019/0272618 A1* | 9/2019 | Boyce | G06T 3/0062 |
| 2019/0387212 A1 | 12/2019 | Oh | |

FOREIGN PATENT DOCUMENTS

| CN | 108475337 A | 8/2018 |
| CN | 109076240 A | 12/2018 |
| CN | 110268711 A | 9/2019 |
| CN | 110520895 A | 11/2019 |

OTHER PUBLICATIONS

"International Search Report" dated Jun. 3, 2021 for International application No. PCT/CN2021/079222, International filing date:Mar. 15, 2021.

* cited by examiner

*Primary Examiner* — Christopher Braniff
(74) *Attorney, Agent, or Firm* — Winston Hsu

(57) ABSTRACT

A video processing method includes a step of receiving a bitstream, and a step of decoding a part of the bitstream to generate a decoded frame, including parsing a plurality of syntax elements from the bitstream. The decoded frame is a projection-based frame that includes a plurality of projection faces packed at a plurality of face positions with different position indexes in a hemisphere cubemap projection layout. A portion of a 360-degree content of a sphere is mapped to the plurality of projection faces via hemisphere cubemap projection. Values of the plurality of syntax elements are indicative of face indexes of the plurality of projection faces packed at the plurality of face positions, respectively, and are constrained to meet a requirement of bitstream conformance.

20 Claims, 10 Drawing Sheets

| gcmp_face_rotation[i] | Rotation angle in degree (anticlockwise) |
|---|---|
| 0 | 0 |
| 1 | 90 |
| 2 | 180 |
| 3 | 270 |

FIG. 5

| gcmp_face_rotation[i] | Rotation angle in degree (clockwise) |
|---|---|
| 0 | 0 |
| 1 | 90 |
| 2 | 180 |
| 3 | 270 |

FIG. 6

METHOD AND APPARATUS FOR PROCESSING PROJECTION-BASED FRAME HAVING PROJECTION FACES PACKED IN HEMISPHERE CUBEMAP PROJECTION LAYOUT WITH FACE PACKING CONSTRAINTS

CROSS REFERENCE TO RELATED APPLICATIONS

This application claims the benefit of U.S. provisional application No. 63/037,064, filed on Jun. 10, 2020 and incorporated herein by reference.

BACKGROUND

The present invention relates to video processing, and more particularly, to a video processing method for processing a projection-based frame having projection faces packed in a hemisphere cubemap projection layout with face packing constraints (e.g., constraints on face index and/or face rotation) and an associated video processing apparatus.

Virtual reality (VR) with head-mounted displays (HMDs) is associated with a variety of applications. The ability to show wide field of view content to a user can be used to provide immersive visual experiences. A real-world environment has to be captured in all directions, resulting in an omnidirectional video corresponding to a viewing sphere. With advances in camera rigs and HMDs, the delivery of VR content may soon become the bottleneck due to the high bitrate required for representing such a 360-degree content. When the resolution of the omnidirectional video is 4K or higher, data compression/encoding is critical to bitrate reduction.

In general, the omnidirectional video corresponding to a sphere is transformed into a frame with a 360-degree image content represented by one or more projection faces arranged in a 360-degree Virtual Reality (360 VR) projection layout, and then the resulting frame is encoded into a bitstream for transmission. The bitstream generated from an encoder side is received and decoded by a decoder side. In addition, a configuration of the employed 360 VR projection layout may also be signaled from the encoder side to the decoder side. When the employed 360 VR projection layout is a hemisphere cubemap projection layout, projection faces packed in a projection-based frame includes one full face and four half faces, where a shape of the full face is a square, and a shape of each half face is not a square. To ensure image quality of the projection-based frame that employs the hemisphere cubemap projection layout, there is a need for an innovative design for applying face packing constrains to the hemisphere cubemap projection layout.

SUMMARY

One of the objectives of the claimed invention is to provide a video processing method for processing a projection-based frame having projection faces packed in a hemisphere cubemap projection layout with face packing constraints (e.g., constraints on face index and/or face rotation) and an associated video processing apparatus.

According to a first aspect of the present invention, an exemplary video processing method is disclosed. The exemplary video processing method includes a step of receiving a bitstream, and a step of decoding, by a decoding circuit, a part of the bitstream to generate a decoded frame, including parsing a plurality of syntax elements from the bitstream. The decoded frame is a projection-based frame that comprises a plurality of projection faces packed at a plurality of face positions with different position indexes in a hemisphere cubemap projection layout. A portion of a 360-degree content of a sphere is mapped to the plurality of projection faces via hemisphere cubemap projection. Values of the plurality of syntax elements are indicative of face indexes of the plurality of projection faces packed at the plurality of face positions, respectively, and are constrained to meet a requirement of bitstream conformance.

According to a second aspect of the present invention, an exemplary video processing method is disclosed. The exemplary video processing method includes a step of receiving a bitstream, and a step of decoding, by a decoding circuit, a part of the bitstream to generate a decoded frame, including parsing a plurality of first syntax elements from the bitstream. The decoded frame is a projection-based frame that comprises a plurality of projection faces packed at a plurality of face positions with different position indexes in a hemisphere cubemap projection layout. A portion of a 360-degree content of a sphere is mapped to the plurality of projection faces via hemisphere cubemap projection. Values of the plurality of first syntax elements are indicative of rotation angles of the plurality of projection faces packed at the plurality of face positions, respectively. A portion of the values of the plurality of first syntax elements are constrained to meet a requirement of bitstream conformance.

According to a third aspect of the present invention, an exemplary video processing apparatus is disclosed. The exemplary video processing apparatus includes a decoding circuit arranged to receive a bitstream and decode a part of the bitstream to generate a decoded frame. The decoding circuit parses a plurality of first syntax elements and a plurality of second syntax elements from the bitstream, wherein the decoded frame is a projection-based frame that comprises a plurality of projection faces packed at a plurality of face positions with different position indexes in a hemisphere cubemap projection layout; a portion of a 360-degree content of a sphere is mapped to the plurality of projection faces via hemisphere cubemap projection; values of the plurality of second syntax elements are indicative of face indexes of the plurality of projection faces packed at the plurality of face positions, respectively, and are constrained to meet a requirement of bitstream conformance; values of the plurality of first syntax elements are indicative of rotation angles of the plurality of projection faces packed at the plurality of face positions, respectively; and a portion of the values of the plurality of first syntax elements are constrained to meet the requirement of bitstream conformance.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 5 is a diagram illustrating one specification of the syntax element gcmp_face_rotation[i] according to an embodiment of the present invention.

FIG. 6 is a diagram illustrating another specification of the syntax element gcmp_face_rotation[i] according to an embodiment of the present invention.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
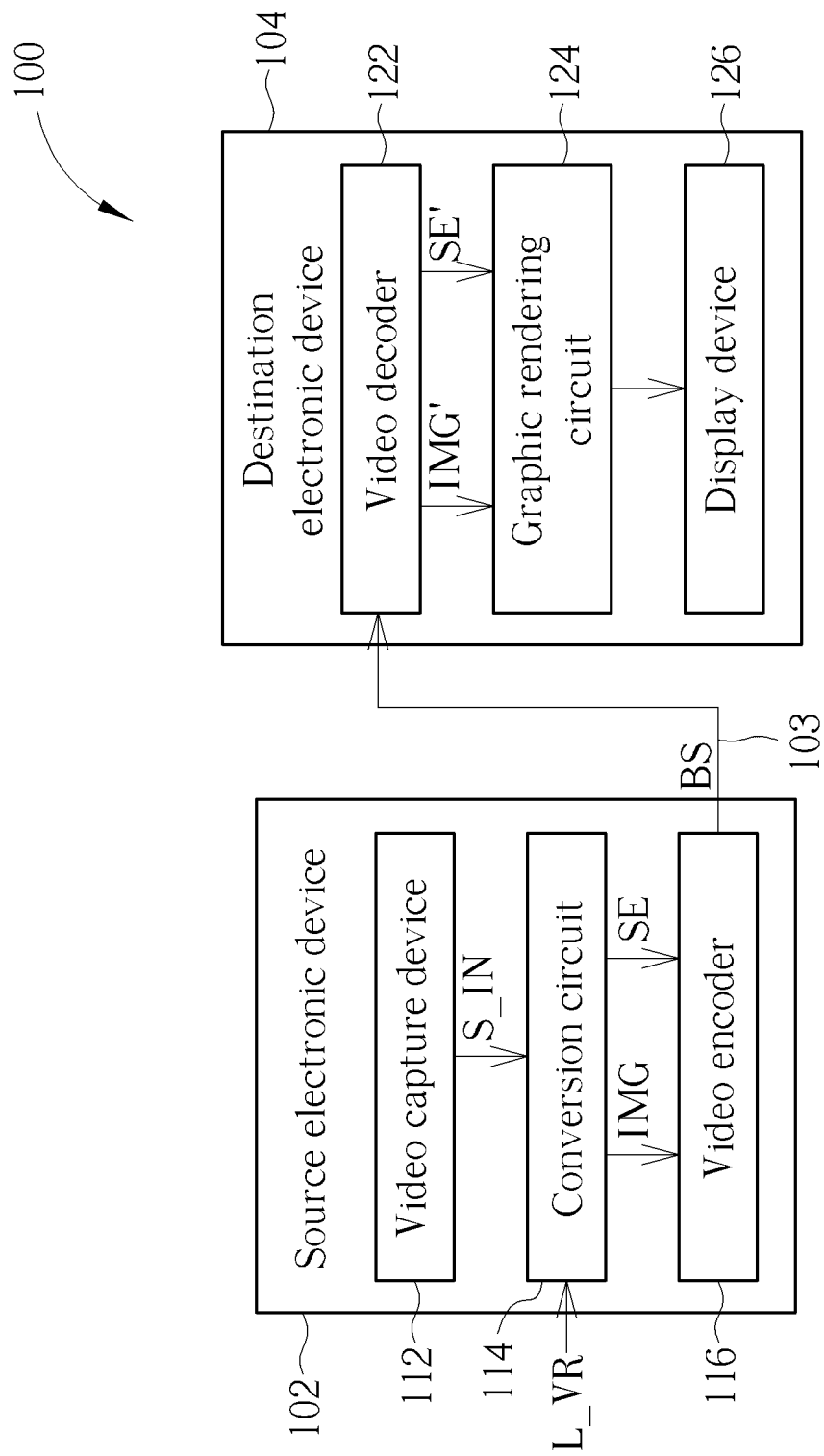
FIG. 1 is a Diagram Illustrating a 360-degree Virtual Reality (360 VR) system according to an embodiment of the present invention.

FIG. 1 is a diagram illustrating a 360-degree Virtual Reality (360 VR) system according to an embodiment of the present invention. The 360 VR system 100 includes two video processing apparatuses (e.g., a source electronic device 102 and a destination electronic device 104). The source electronic device 102 includes a video capture device 112, a conversion circuit 114, and a video encoder 116. For example, the video capture device 112 may be an omnidirectional camera. The conversion circuit 114 generates a projection-based frame IMG with a 360-degree Virtual Reality (360 VR) projection layout L_VR according to an omnidirectional video frame S_IN corresponding to a sphere, where the omnidirectional video frame S_IN contains a 360-degree content of the sphere. The video encoder 116 is an encoding circuit that encodes the projection-based frame IMG (which has projection face(s) packed in the 360 VR projection layout L_VR) to generate a part of a bitstream BS, and outputs the bitstream BS to the destination electronic device 104 via a transmission means 103 such as a wired/wireless communication link or a storage medium.

The destination electronic device 104 may be a head-mounted display (HMD) device. As shown in FIG. 1, the destination electronic device 104 includes a video decoder 122, a graphic rendering circuit 124, and a display device 126. The video decoder 122 is a decoding circuit that receives the bitstream BS from the transmission means 103 (e.g., wired/wireless communication link or storage medium), and decodes a part of the received bitstream BS to generate a decoded frame IMG'. In this embodiment, the projection-based frame IMG to be encoded by the video encoder 116 has the 360 VR projection layout L_VR. Hence, after a part of the bitstream BS is decoded by the video decoder 122, the decoded frame (i.e., reconstructed frame) IMG' has the same 360 VR projection layout L_VR. In other words, the decoded frame IMG' is also a projection-based frame that has projection face(s) packed in the 360 VR projection layout L_VR. In the following, the terms "decoded frame" and "projection-based frame" may be interchangeable. The graphic rendering circuit 124 is arranged to drive the display device 126 to show an image content of a viewport area selected by a user.

Figure 2:
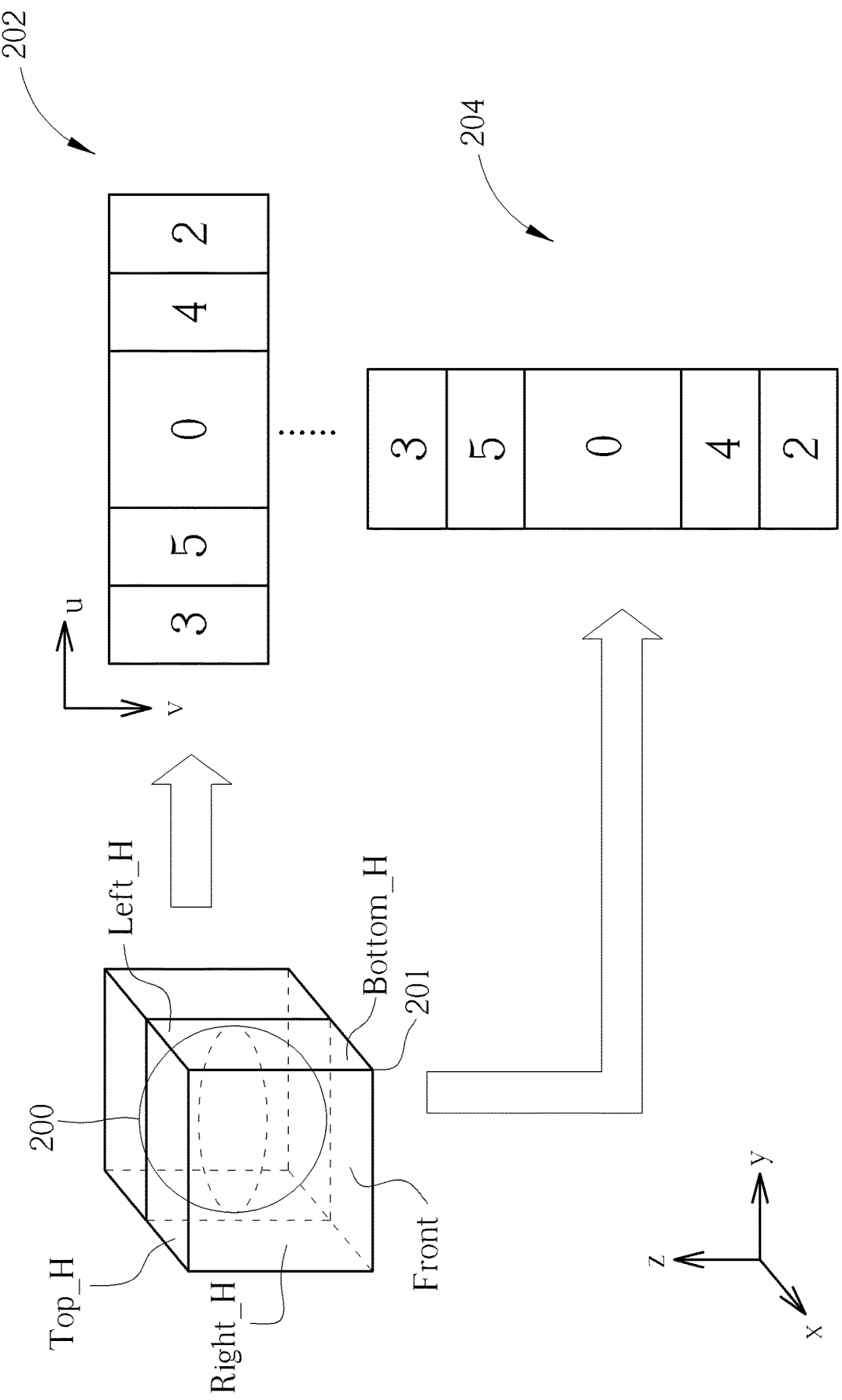
FIG. 2 is a diagram illustrating a hemisphere cubemap projection according to an embodiment of the present invention.

In this embodiment, the 360 VR projection layout L_VR may be a hemisphere cubemap projection layout. Specifically, cube-based projection with five projection faces (which include one full face and four half faces) representing 180°×180° omnidirectional video (i.e., only a part of a 360-degree content of a sphere) may be employed. Regarding the conversion circuit 114 of the source electronic device 102, hemisphere cubemap projection is employed to generate one full face and four half faces of a cube in a three-dimensional (3D) space. FIG. 2 is a diagram illustrating a hemisphere cubemap projection according to an embodiment of the present invention. Only a half of the 360-degree content on the sphere 200 is projected onto faces of a cube 201, including a top half face (labeled by "Top_H"), a bottom half face (labeled by "Bottom_H"), a left half face (labeled by "Left_H"), a front full face (labeled by "Front"), and a right half face (labeled by "Right_H"). In this example, a half of the cube 201 is employed for hemisphere cubemap projection, where a hemisphere (e.g., a half of the sphere 200) is inscribed in the half of the cube 201. As shown in FIG. 2, an image content of a half of a north polar region of the sphere 200 is projected onto the top half face "Top_H" (which is a half of a top face of the cube 201), an image content of a half of a south polar region of the sphere 200 is projected onto the bottom half face "Bottom_H" (which is a half of a bottom face of the cube 201), and an image content of a half of an equatorial region of the sphere 200 is projected onto the left half face "Left_H" (which is a half of a left face of the cube 201), the front full face "Front" (which is a front face of the cube 201), and the right half face "Right_H" (which is a half of a right face of the cube 201).

In the 3D space that is defined by x-axis, y-axis, and z-axis, each point on five projected faces is located at (x, y, z), where x,y,z∈[−1,1]. In this example shown in FIG. 2, the front full face "Front" is on an x-plane with x=1, the top half face "Top_H" is on a z-plane with z=1, the bottom half face "Bottom_H" is on a z-plane with z=−1, the left half face "Left_H" is on a y-plane with y=1, and the right half face "Right_H" is on a y-plane with y=−1. In an alternative design, the front full face "Front" may be on an x-plane with x=1, the top half face "Top_H" may be on a y-plane with y=1, the bottom half face "Bottom_H" may be on a y-plane with y=−1, the right half face "Right_H" may be on a z-plane with z=1, and the left half face "Left_H" may be on a z-plane with z=−1.

Forward transformation can be used to transform from the 3D space (x, y, z) to the 2D plane (u, v). Hence, the top half face "Top_H", bottom half face "Bottom_H", left half face "Left_H", front full face "Front", and right half face "Right_H" of the cube 201 in the 3D space can be transformed into a top half face (labeled by "2"), a bottom half face (labeled by "3"), a left half face (labeled by "5"), a front full face (labeled by "0"), and a right half face (labeled by "4") on the two-dimensional (2D) plane. Each face is on one 2D plane defined by u-axis in a horizontal direction and v-axis in a vertical direction, and has each point located at (u, v). In addition, a size of the front full face (labeled by "0") is twice as large as a size of each of top half face (labeled by "2"), bottom half face (labeled by "3"), left half face (labeled by "5"), and right half face (labeled by "4").

Inverse transformation can be used to transform from the 2D plane (u, v) to the 3D space (x, y, z). Hence, the top half face (labeled by "2"), the bottom half face (labeled by "3"), the left half face (labeled by "5"), the front full face (labeled by "0"), and the right half face (labeled by "4") on the 2D plane can be transformed into the top half face "Top_H", bottom half face "Bottom_H", left half face "Left_H", front full face "Front", and right half face "Right_H" of the cube 201 in the 3D space.

The inverse transformation can be employed by the conversion circuit 114 of the source electronic device 102 for generating the top half face "2", bottom half face "3", left half face "5", front full face "0", and right half face "4". The top half face "2", bottom half face "3", left half face "5", front full face "0", and right half face "4" on the 2D plane are packed to form the projection-based frame IMG to be encoded by the video encoder 116. The video decoder 122 receives the bitstream BS from the transmission means 103, and decodes a part of the received bitstream BS to generate the decoded frame IMG' that has the same projection layout L_VR (e.g., hemisphere cubemap layout) adopted at the encoder side.

As mentioned above, the top half face "2", bottom half face "3", left half face "5", front full face "0", and right half face "4" are packed to form the projection-based frame IMG. For example, the conversion circuit 114 may select one packing type, such that the projection-based frame IMG may have projected image data arranged in one cube-based projection layout (hemisphere cubemap layout) 202. For another example, the conversion circuit 114 may select another packing type, such that the projection-based frame IMG may have projected image data arranged in another cube-based projection layout (hemisphere cubemap layout) 204 that is different from the cube-based projection layout (hemisphere cubemap layout) 202. In this embodiment, the front face is selected as the full face that is packed in the cube-based projection layout 202/204. In practice, the full face packed in the cube-based projection layout 202/204 may be any of the top face, the bottom face, the front face, the back face, the left face, and the right face, and the four half faces packed in the cube-based projection layout 202/204 depend on the selection of the full face.

Figure 3:
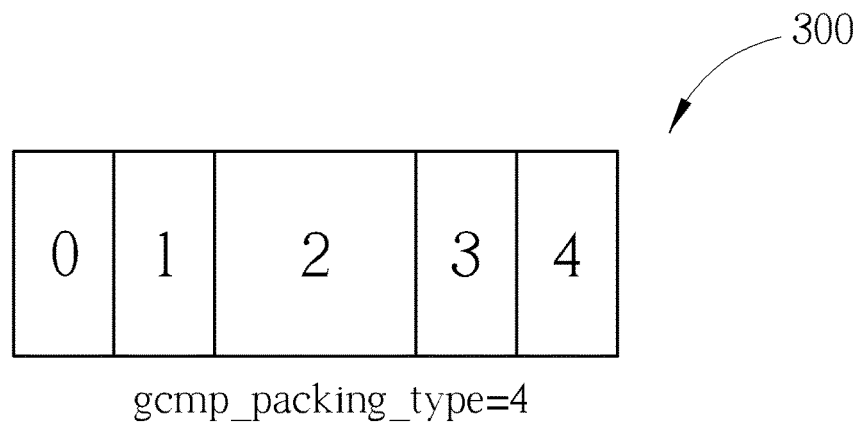
FIG. 3 is a diagram illustrating a horizontally packed hemisphere cubemap projection layout according to an embodiment of the present invention.
Figure 4:
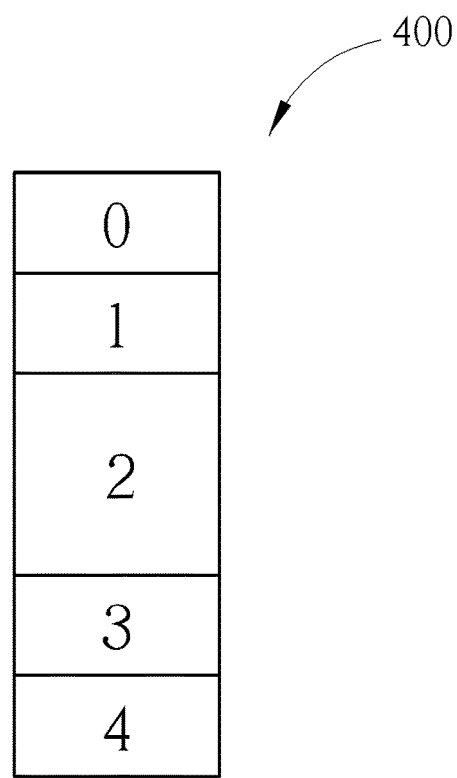
FIG. 4 is a diagram illustrating a vertically packed hemisphere cubemap projection layout according to an embodiment of the present invention.

The cube-based projection layout 202 is also referred to as a horizontally packed hemisphere cubemap projection layout having all projection faces packed horizontally. The cube-based projection layout 204 is also referred to as a vertically packed hemisphere cubemap projection layout having all projection faces packed vertically. FIG. 3 is a diagram illustrating a horizontally packed hemisphere cubemap projection layout according to an embodiment of the present invention. The horizontally packed hemisphere cubemap projection layout 300 has five face positions with different position indexes "0", "1", "2", "3", "4", where a full face is packed at a face position with a position index "2", and four half faces are packed at face positions with position indexes "0", "1", "3", "4", respectively. FIG. 4 is a diagram illustrating a vertically packed hemisphere cubemap projection layout according to an embodiment of the present invention. The vertically packed hemisphere cubemap projection layout 400 has five face positions with different position indexes "0" "1" "2" "3" "4" where a full face is packed at a face position with a position index "2", and four half faces are packed at face positions with position indexes "0", "1", "3", "4", respectively.

The conversion circuit 114 can determine a configuration of the projection-based frame IMG that consists of projection faces derived from cube-based projection (e.g., hemisphere cubemap projection shown in FIG. 2), and the video encoder 116 can signal syntax element(s) SE via the bitstream BS. For example, the syntax element(s) SE may be associated with packing of the projection faces in the projection-based frame IMG. Hence, the video decoder 122 can parse the syntax element(s) SE' associated with the packing configuration of the projection faces in the projection-based frame IMG from the bitstream BS, and can provide the graphic rendering circuit 124 with the parsed syntax element(s) SE', such that the graphic rendering circuit 124 is informed of the configuration information of face packing. It should be noted that the projection-based frame IMG and the decoded frame IMG' have the same configuration of face packing. In this way, when determining an image content of a viewport area selected by a user, the graphic rendering circuit 124 can refer to the configuration information of face packing to correctly determine pixel values of the selected viewport area. Ideally, syntax element(s) SE encoded into the bitstream BS by the video encoder 116 are the same as the syntax element(s) SE' parsed from the bitstream BS by the video decoder 122. For example, syntax element(s) SE/SE' indicative of configuration of face packing may include gcmp_packing_type, gcmp_face_rotation, gcmp_face_index, etc.

The syntax element gcmp_packing_type specifies a packing type of packing of projection faces in a cube-based projection layout, and further specifies a pre-defined arrangement of position indexes assigned to face positions under the selected packing type. When the value of gcmp_packing_type is 4 or 5, hemisphere cubemap packing with one full face and four half faces is used, where each packing type is associated with five face positions assigned with position indexes {0, 1, 2, 3, 4}, respectively. Specifically, when the horizontally packed hemisphere cubemap projection layout 300 shown in FIG. 3 is employed, the value of gcmp_packing_type is equal to 4; and when the vertically packed hemisphere cubemap projection layout 400 shown in FIG. 4 is employed, the value of gcmp_packing_type is equal to 5.

The syntax element gcmp_face_index[i] may specify a face index for a position index i under a packing type specified by the syntax element gcmp_packing_type. Taking the hemisphere cubemap projection for example, the front full/half face may be assigned with a face index gcmp_face_index[i]=0, the back full/half face may be assigned with a face index gcmp_face_index[i]=1, the top full/half face may be assigned with a face index gcmp_face_index[i]=2, the bottom full/half face may be assigned with a face index gcmp_face_index[i]=3, the right full/half face may be assigned with a face index gcmp_face_index[i]=4, and the left full/half face may be assigned with a face index gcmp_face_index[i]=5. Hence, when the syntax element gcmp_packing_type is set by 4 or 5, the syntax element gcmp_face_index[i] specifies a face index of a projection face (e.g., front face "0", back face "1", top face "2", bottom face "3", right face "4", or left face "5" shown in FIG. 2), where the projection face with the face index specified by the syntax element gcmp_face_index[i] is packed at a face position with the position index i under the selected packing type.

The syntax element gcmp_face_rotation[i] specifies a rotation with a rotation angle that is applied to the projection face packed at the face position with the position index i under the packing type specified by the syntax element gcmp_packing_type. FIG. 5 is a diagram illustrating one specification of the syntax element gcmp_face_rotation[i] according to an embodiment of the present invention. Hence, when a rotation angle of rotation applied to the projection face to be packed at the face position with the position index i is 0°, the syntax element gcmp_face_rotation[i] is set by 0; when the rotation angle of rotation applied to the projection face to be packed at the face position with the position index i is 90° anticlockwise, the syntax element gcmp_face_rotation[i] is set by 1; when the rotation angle of rotation applied to the projection face to be packed at the face position with the position index i is 180° anticlockwise, the syntax element gcmp_face_rotation[i] is set by 2; and when the rotation angle of rotation applied to the projection face to be packed at the face position with the position index i is 270° anticlockwise, the syntax element gcmp_face_rotation[i] is set by 3.

In some embodiments of the present invention, inputs of the rotation process may include width faceWidth and height faceHeight of a projection face (full face), and may further include a sample location (hPosFace, vPosFace) within the projection face on a 2D plane. The width faceWidth may be the same as the height faceHeight. An output of the rotation process may include a rotated sample location (hPosRot, vPosRot) within the projection face on the 2D plane. The output may be derived as follows:

```
If (gcmp_face_rotation[i] = = 0 ) {
    hPosRot = hPosFace
    vPosRot = vPosFace
} else if (gcmp_face_rotation[i] = = 1 ) {
    hPosRot = vPosFace
    vPosRot = faceWidth – hPosFace
} else if (gcmp_face_rotation[i] = = 2 ) {
    hPosRot = faceWidth – hPosFace
    vPosRot = faceHeight – vPosFace
} else if (gcmp_face_rotation[i] = = 3 ) {
    hPosRot = faceHeight – vPosFace
    vPosRot = hPosFace
}
```

In above example, rotation applied to one projection face is defined by a rotation angle in an anticlockwise direction. However, this is for illustrative purposes only, and is not meant to be a limitation of the present invention. In one alternative design, rotation applied to one projection face may be defined by a rotation angle in a clockwise direction. FIG. 6 is a diagram illustrating another specification of the syntax element gcmp_face_rotation[i] according to an embodiment of the present invention.

As mentioned above, one full face and four half faces are packed in a hemisphere cubemap projection layout such as the horizontally packed hemisphere cubemap projection layout 300 (gcmp_packing_type=4) or the vertically packed hemisphere cubemap projection layout 400 (gcmp_packing_type=5). To represent a continuous 180°×180° omnidirectional video content, the four half faces packed in the hemisphere cubemap projection layout on the 2D plane should be derived from half faces connected to (adjacent to) the full face in the 3D space. An embodiment of the present invention proposes applying constraints to selection of half faces packed in the hemisphere cubemap projection layout. That is, the conversion circuit 114 is arranged to apply constrains to face indexes of half faces packed at face positions with position indexes {0, 1, 3, 4}, for meeting a requirement of bitstream conformance. Syntax elements gcmp_face_index[i] indicative of face indexes of half faces packed in the hemisphere cubemap projection layout are signaled via the bitstream BS. With the proposed constraints on the face indexes, the bitstream BS that meets the requirement of bitstream conformance is generated and transmitted from the source electronic device 102 to the destination electronic device 104. At the destination electronic device 104, the bitstream BS that meets the requirement of bitstream conformance does not contain invalid syntax values and is decodable at the video decoder 122. The video decoder 122 can parse the syntax element(s) SE' associated with the packing configuration of the projection faces in the projection-based frame IMG from the bitstream BS, and can provide the graphic rendering circuit 124 with the parsed syntax element(s) SE' for allowing the graphic rendering circuit 124 to correctly deal with post-processing of the decoded frame IMG' with the same hemisphere cubemap projection layout.

Figure 7:
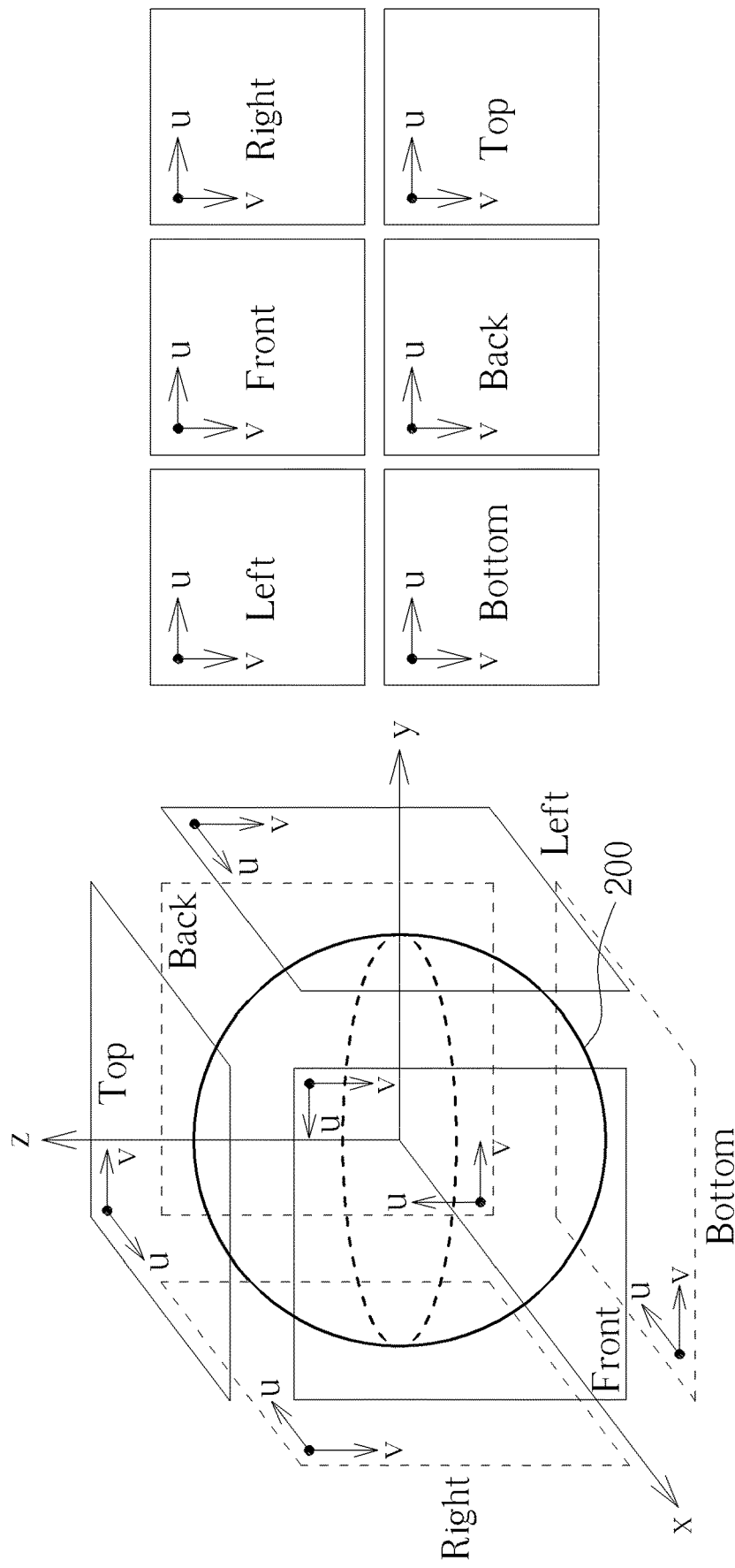
FIG. 7 is a diagram illustrating the coordinate definition according to an embodiment of the present invention.

With regard to applying constraints to face indexes of half faces packed in the hemisphere cubemap projection layout, the used coordinate definition is illustrated in FIG. 7, where the viewing perspective is from an origin of the sphere 200 looking outward toward the inside of the sphere 200. Each of the projection faces respectively derived from square faces of a cube in the 3D space is located on one 2D plane defined by u-axis and v-axis, and has each local sample location located at (u, v) within the projection face with an origin of coordinates illustrated in FIG. 7.

As mentioned above, the full face packed in the hemisphere cubemap projection layout may be any of the top face, the bottom face, the front face, the back face, the left face, and the right face, and the four half faces packed in the hemisphere cubemap projection layout depend on the selection of the full face. A half face to be packed in the hemisphere cubemap projection layout may be a half of a front face, a half of a back face, a half of a left face, a half of a right face, a half of a top face, or a half of a bottom face, depending upon the selection of the full face to be packed in the hemisphere cubemap projection layout and the spatial relation between the full face and the half faces.

Figure 8:
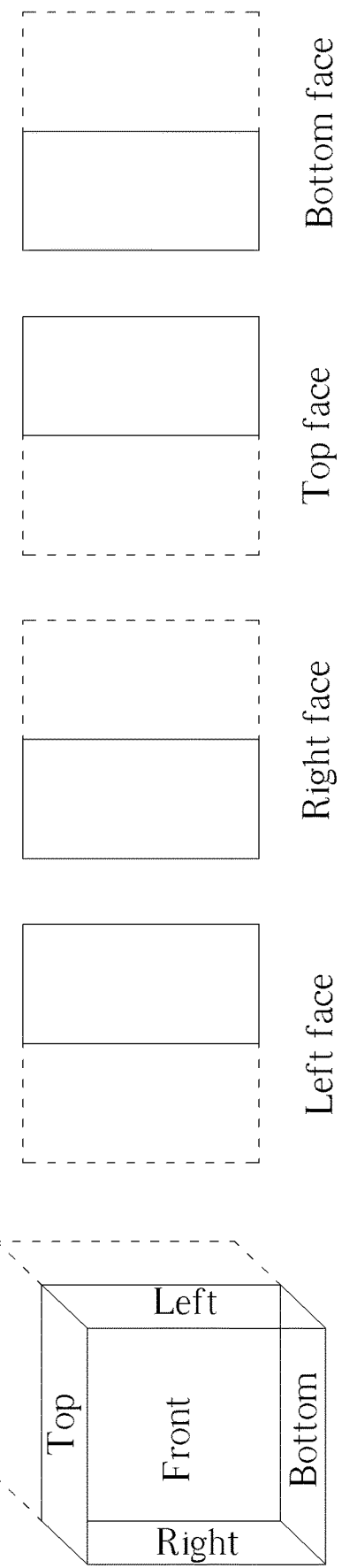
FIG. 8 is a diagram illustrating an example of four half faces selected for the hemisphere cubemap projection layout under a condition that the front face is selected as the full face.

FIG. 8 is a diagram illustrating an example of four half faces selected for the hemisphere cubemap projection layout under a condition that the front face is selected as the full face. In accordance with the coordinate definition illustrated in FIG. 7, the four half faces in the hemisphere cubemap projection layout include a right half of the left face, a left half of the right face, a right half of the top face, and a left half of the bottom face.

Figure 9:
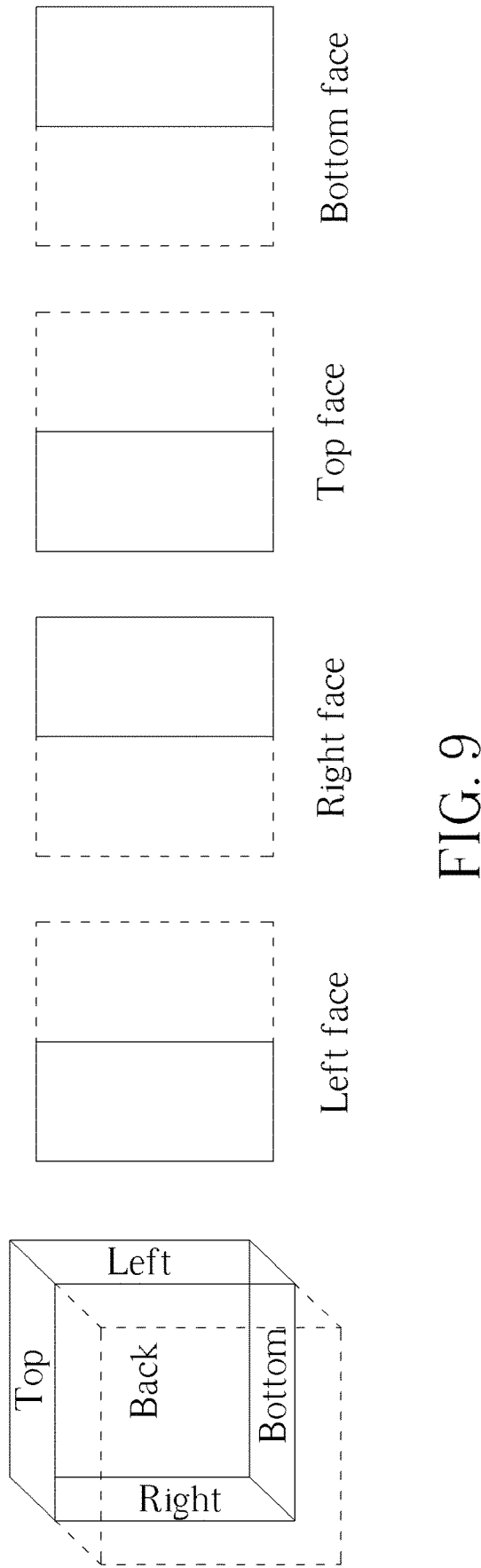
FIG. 9 is a diagram illustrating an example of four half faces selected for the hemisphere cubemap projection layout under a condition that the back face is selected as the full face.

FIG. 9 is a diagram illustrating an example of four half faces selected for the hemisphere cubemap projection layout under a condition that the back face is selected as the full face. In accordance with the coordinate definition illustrated in FIG. 7, the four half faces in the hemisphere cubemap projection layout include a left half of the left face, a right half of the right face, a left half of the top face, and a right half of the bottom face.

Figure 10:
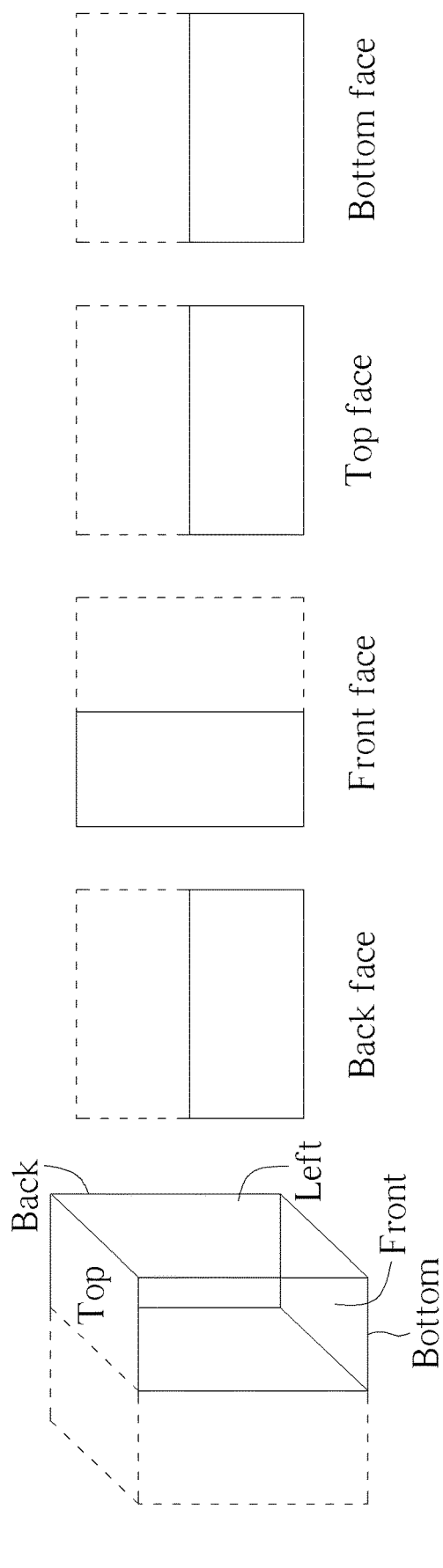
FIG. 10 is a diagram illustrating an example of four half faces selected for the hemisphere cubemap projection layout under a condition that the left face is selected as the full face.

FIG. 10 is a diagram illustrating an example of four half faces selected for the hemisphere cubemap projection layout under a condition that the left face is selected as the full face. In accordance with the coordinate definition illustrated in FIG. 7, the four half faces in the hemisphere cubemap projection layout include a bottom half of the back face, a left half of the front face, a bottom half of the top face, and a bottom half of the bottom face.

Figure 11:
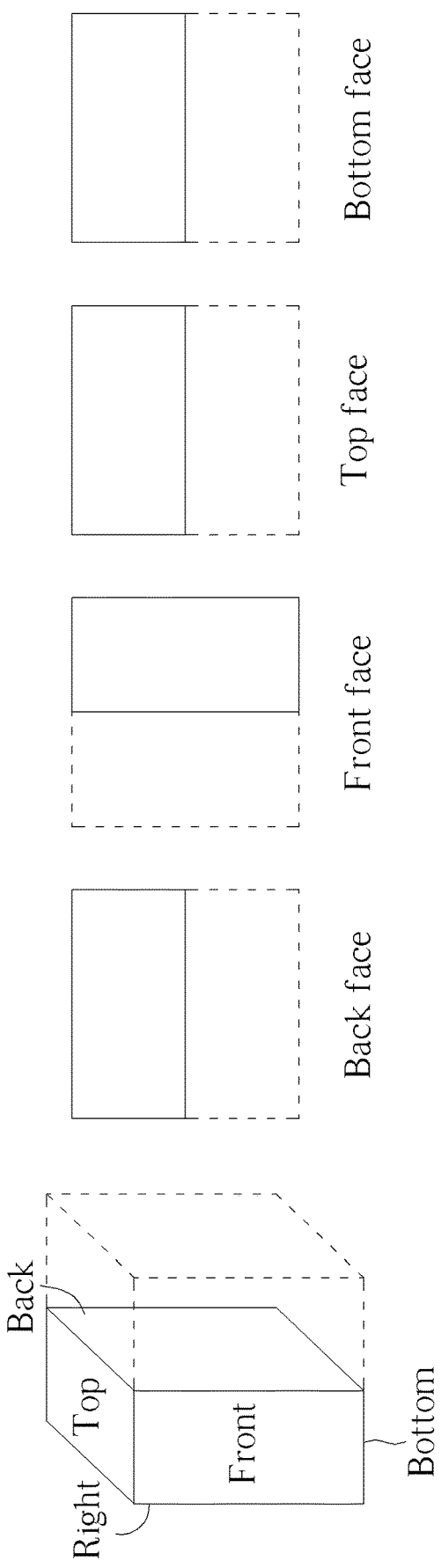
FIG. 11 is a diagram illustrating an example of four half faces selected for the hemisphere cubemap projection layout under a condition that the right face is selected as the full face.

FIG. 11 is a diagram illustrating an example of four half faces selected for the hemisphere cubemap projection layout under a condition that the right face is selected as the full face. In accordance with the coordinate definition illustrated in FIG. 7, the four half faces in the hemisphere cubemap projection layout include a top half of the back face, a right half of the front face, a top half of the top face, and a top half of the bottom face.

Figure 12:
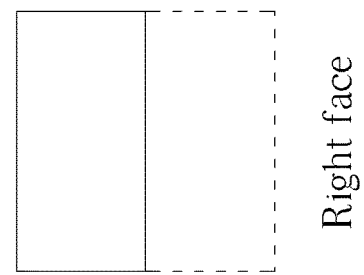
FIG. 12 is a diagram illustrating an example of four half faces selected for the hemisphere cubemap projection layout under a condition that the top face is selected as the full face.
Figure 12:
Figure 12:
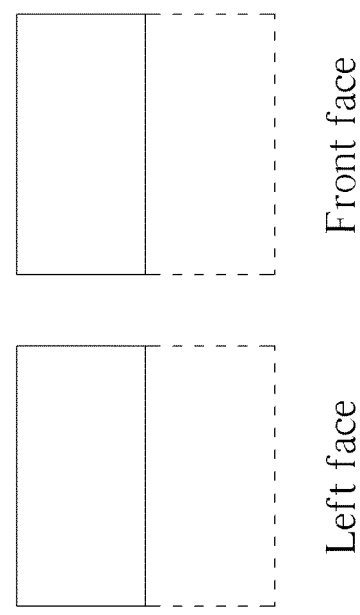
Figure 12:
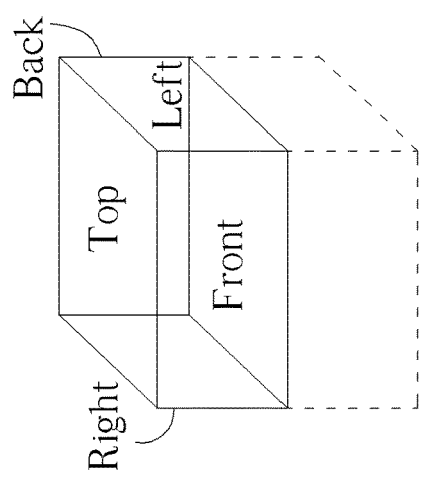

FIG. 12 is a diagram illustrating an example of four half faces selected for the hemisphere cubemap projection layout under a condition that the top face is selected as the full face. In accordance with the coordinate definition illustrated in FIG. 7, the four half faces in the hemisphere cubemap projection layout include a top half of the left face, a top half of the front face, a right half of the back face, and a top half of the right face.

Figure 13:
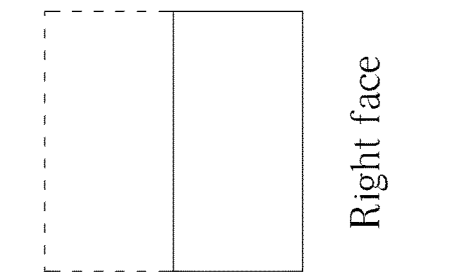
FIG. 13 is a diagram illustrating an example of four half faces selected for the hemisphere cubemap projection layout under a condition that the bottom face is selected as the full face.
Figure 13:
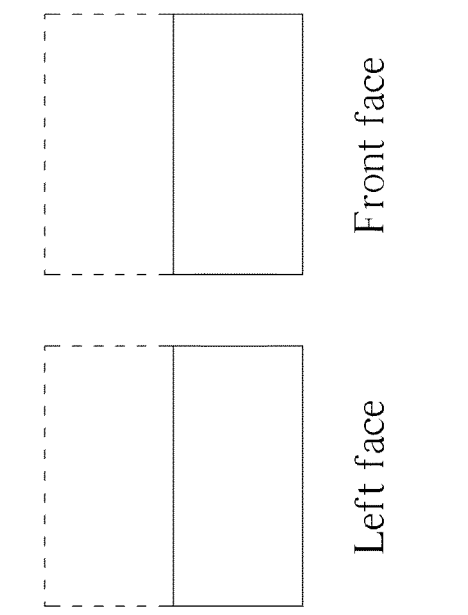
Figure 13:
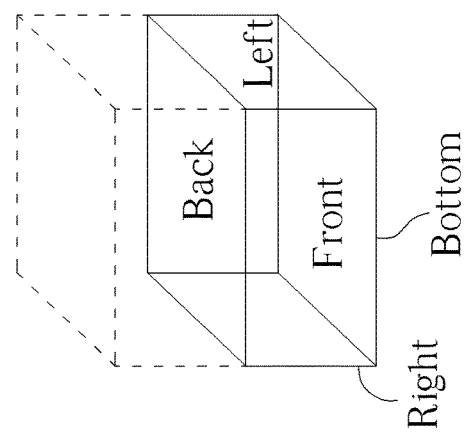

FIG. 13 is a diagram illustrating an example of four half faces selected for the hemisphere cubemap projection layout under a condition that the bottom face is selected as the full face. In accordance with the coordinate definition illustrated in FIG. 7, the four half faces in the hemisphere cubemap projection layout include a bottom half of the left face, a bottom half of the front face, a left half of the back face, and a bottom half of the right face.

When the value of gcmp_packing_type is set by 4 or 5, constraints on face index values can guarantee that the projection-based frame IMG/IMG' under the selected packing type contains a continuous 180°×180° omnidirectional video content of the sphere 200. According to selection of the full face that is specified by gcmp_face_index[2], the four half faces can be determined and specified by gcmp_face_index[i] for i={0, 1, 3, 4} to achieve the objective of having a continuous 180°×180° omnidirectional video content in the projection-based frame IMG/IMG'. For example, when gcmp_packing_type is equal to 4 or 5, it is a requirement of bitstream conformance that the following constraints apply:

If gcmp_face_index[2] is equal to 0 or 1, the value of gcmp_face_index[i] for i equal to 0, 1, 3 or 4 shall be in the range of 2 to 5, inclusive.

Otherwise, if gcmp_face_index[2] is equal to 2 or 3, the value of gcmp_face_index[i] for i equal to 0, 1, 3 or 4 shall be 0, 1, 4, or 5.

Otherwise, the value of gcmp_face_index[i] for i equal to 0, 1, 3 or 4 shall be in the range of 0 to 3, inclusive.

In a first case where a full face packed at a face position with a position index 2 is set by a front face or a back face, four faces packed at face positions with position indexes 0, 1, 3, 4 are constrained to be a half face of a left face, a half face of a right face, a half face of a top face, and a half face of a bottom face, as illustrated in FIGS. 8-9. In a second case where a full face packed at a face position with a position index 2 is set by a top face or a bottom face, four faces packed at face positions with position indexes 0, 1, 3, 4 are constrained to be a half face of a front face, a half face of a back face, a half face of a right face, and a half face of a left face, as illustrated in FIGS. 12-13. In a third case where a full face packed at a face position with a position index 2 is set by a right face or a left face, four faces packed at face positions with position indexes 0, 1, 3, 4 are constrained to be a half face of a front face, a half face of a back face, a half face of a top face, and a half face of a bottom face, as illustrated in FIGS. 10-11.

As mentioned above, a rotation with a rotation angle may be applied to a projection face packed at a face position with a position index under a selected packing type. That is, a face after rotation is packed in the hemisphere cubemap projection layout, where the rotation information is specified by the syntax element gcmp_face_rotation. The rotation angle of a half face should be constrained so as to ensure that the half face after rotation can fit in the hemisphere cubemap projection layout specified by the syntax element gcmp_packing_type.

Figure 14:
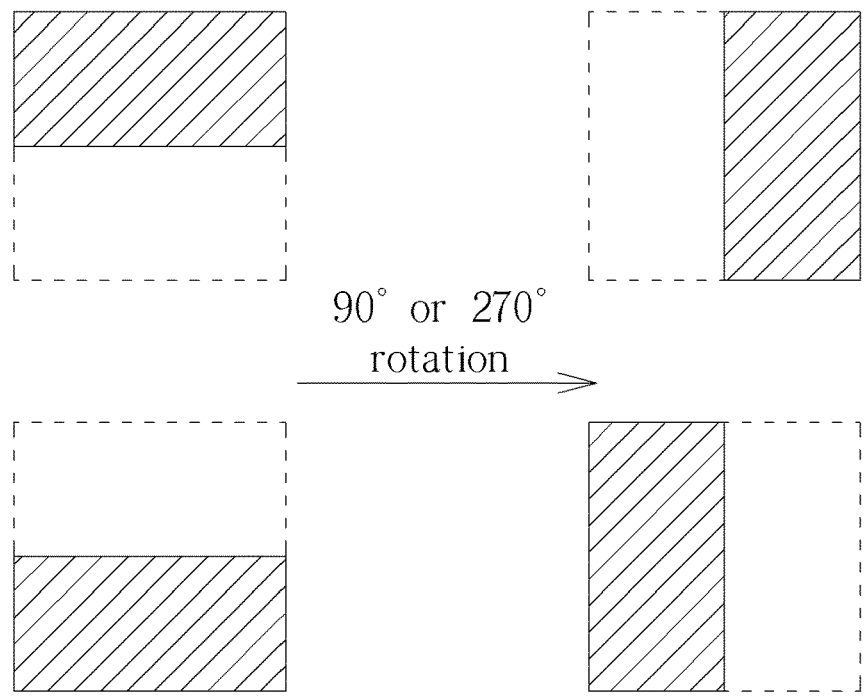
FIG. 14 is a diagram illustrating one rotation angle constraint for half faces packed in a horizontally packed hemisphere layout according to an embodiment of the present invention.
Figure 15:
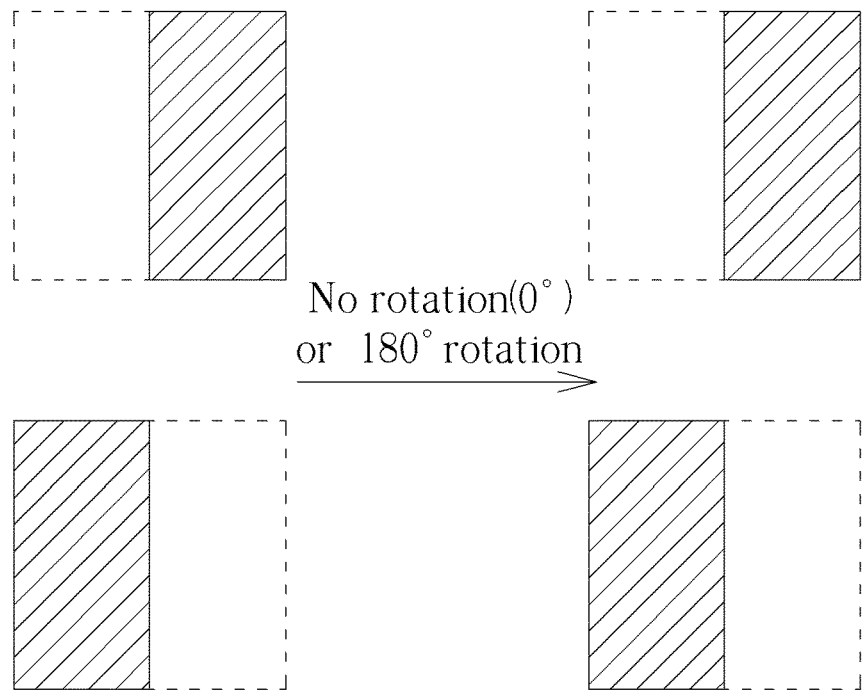
FIG. 15 is a diagram illustrating another rotation angle constraint for half faces packed in a horizontally packed hemisphere layout according to an embodiment of the present invention.

For example, when the horizontally packed hemisphere layout 300 (gcmp_packing_type=4) is used, the rotation of half faces is constrained. If a half face packed at a face position with a position index i that is not equal to 2 (i.e., i=0, 1, 3, or 4) is derived from a top half or a bottom half of a square face of a cube in the 3D space, a value of a syntax element gcmp_face_rotation[i] assigned to the position index i indicates a rotation angle selected from a group consisting of 90° and 270°. That is, the rotation angle should be 90° or 270° clockwise/anticlockwise to ensure that the half face after rotation can be fit into the horizontally packed hemisphere layout 300, as illustrated in FIG. 14. If a half face packed at a face position with a position index i that is not equal to 2 (i.e., i=0, 1, 3, or 4) is derived from a left half or a right half of a square face of a cube in the 3D space, a value of a syntax element gcmp_face_rotation[i] assigned to the position index i indicates a rotation angle selected from a group consisting of 0° and 180°. That is, the rotation angle should be 0° or 180° clockwise/anticlockwise to ensure that the half face after rotation can be fit into the horizontally packed hemisphere layout 300, as illustrated in FIG. 15.

Figure 16:
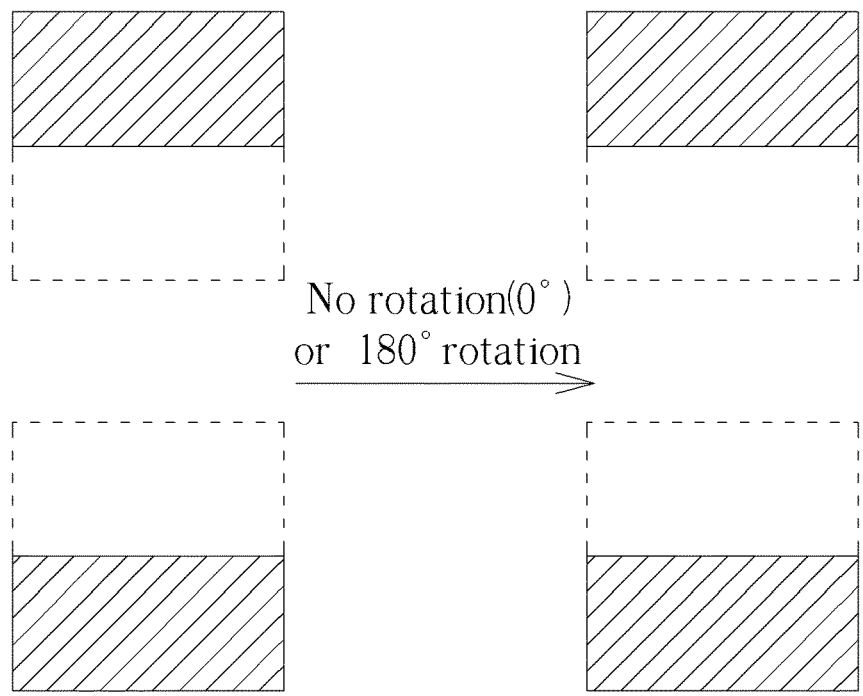
FIG. 16 is a diagram illustrating one rotation angle constraint for half faces packed in a vertically packed hemisphere layout according to an embodiment of the present invention.
Figure 17:
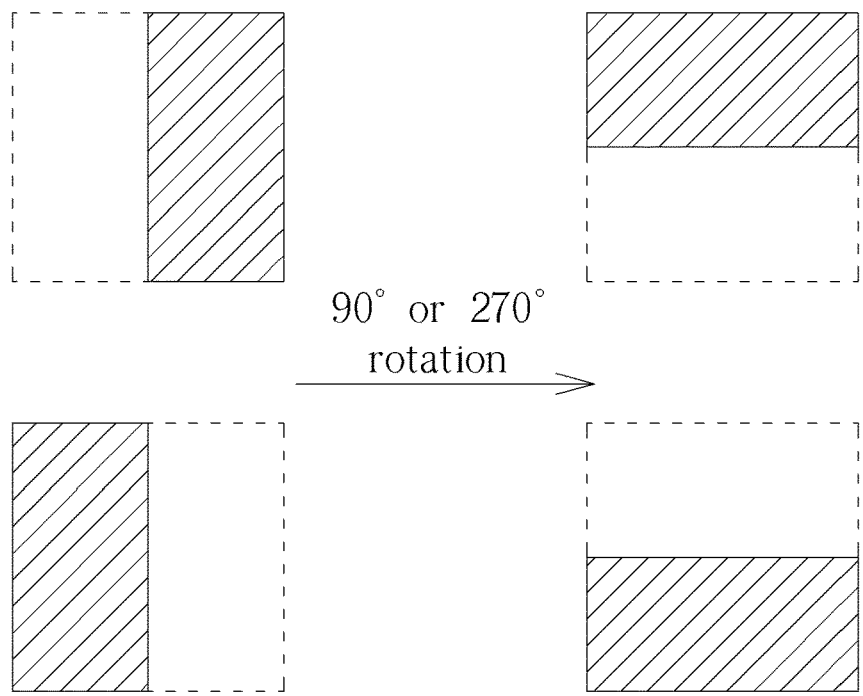
FIG. 17 is a diagram illustrating another rotation angle constraint for half faces packed in a vertically packed hemisphere layout according to an embodiment of the present invention.

For another example, when the vertically packed hemisphere layout 400 (gcmp_packing_type=5) is used, the rotation of half faces is constrained. If a half face packed at a face position with a position index i that is not equal to 2 (i.e., i=0, 1, 3, or 4) is derived from a top half or a bottom half of a square face of a cube in the 3D space, a value of a syntax element gcmp_face_rotation[i] assigned to the position index i indicates a rotation angle selected from a group consisting of 0° and 180°. That is, the rotation angle should be 0° or 180° clockwise/anticlockwise to ensure that the half face after rotation can be fit into the vertically packed hemisphere layout 400, as illustrated in FIG. 16. If a half face packed at a face position with a position index i that is not equal to 2 (i.e., i=0, 1, 3, or 4) is derived from a left half or a right half of a square face of a cube in the 3D space, a value of a syntax element gcmp_face_rotation[i] assigned to the position index i indicates a rotation angle selected from a group consisting of 90° and 270°. That is, the rotation angle should be 90° or 270° clockwise/anticlockwise to ensure that the half face after rotation can be fit into the vertically packed hemisphere layout 400, as illustrated in FIG. 17.

In summary, when gcmp_packing_type is equal to 4, it is a requirement of bitstream conformance that the following constraints apply:

If gcmp_face_index[2] is equal to 0 or 1, the value of gcmp_face_rotation[i] for i equal to 0, 1, 3 or 4 shall be 0 or 2.

Otherwise, if gcmp_face_index[2] is equal to 2 or 3, when gcmp_face_index[i] is equal to 1, the value of gcmp_face_rotation[i] shall be 0 or 2, and when gcmp_face_index[i] is equal to 0, 4 or 5, the value of gcmp_face_rotation[i] shall be 1 or 3.

Otherwise, when gcmp_face_index[i] is equal to 0, the value of gcmp_face_rotation[i] shall be 0 or 2, and when gcmp_face_index[i] is equal to 1, 2 or 3, the value of gcmp_face_rotation[i] shall be 1 or 3.

When gcmp_packing_type is equal to 5, it is a requirement of bitstream conformance that the following constraints apply:

If gcmp_face_index[2] is equal to 0 or 1, the value of gcmp_face_rotation[i] for i equal to 0, 1, 3 or 4 shall be 1 or 3.

Otherwise, if gcmp_face_index[2] is equal to 2 or 3, when gcmp_face_index[i] is equal to 1, the value of gcmp_face_rotation[i] shall be 1 or 3, and when gcmp_face_index[i] is equal to 0, 4 or 5, the value of gcmp_face_rotation[i] shall be 0 or 2.

Otherwise, when gcmp_face_index[i] is equal to 0, the value of gcmp_face_rotation[i] shall be 1 or 3, and when gcmp_face_index[i] is equal to 1, 2 or 3, the value of gcmp_face_rotation[i] shall be 0 or 2.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video processing method comprising:
receiving a bitstream; and
decoding a part of the bitstream to generate a decoded frame, comprising:
parsing a plurality of syntax elements from the bitstream;
wherein the decoded frame is a projection-based frame that comprises a plurality of projection faces packed at a plurality of face positions with different position indexes in a hemisphere cubemap projection layout; the plurality of projection faces packed at the plurality of face positions in the hemisphere cubemap projection layout comprise a full face; a portion of a 360-degree content of a sphere is mapped to the plurality of projection faces via hemisphere cubemap projection; values of the plurality of syntax elements are indicative of face indexes of the plurality of projection faces packed at the plurality of face positions, respectively, and are constrained to meet a requirement of bitstream conformance; and constraint applied to the values of the plurality of syntax elements in response to the full face set by a first face which is one of a top face, a bottom face, a front face, a back face, a left face and a right face is different from constraint applied to the values of the plurality of syntax elements in response to the full face set by a second face which is adjacent to the first face.

2. The video processing method of claim 1, wherein the plurality of projection faces comprise the full face packed at a face position with a position index, a value of a syntax element assigned to the position index indicates a face index of the front face, and a value of a syntax element assigned to any other position index indicates a face index selected from a group consisting of a face index of the left face, a face index of the right face, a face index of the top face, and a face index of the bottom face.

3. The video processing method of claim 1, wherein the plurality of projection faces comprise the full face packed at a face position with a position index, a value of a syntax element assigned to the position index indicates a face index of the back face, and a value of a syntax element assigned to any other position index indicates a face index selected from a group consisting of a face index of the left face, a face index of the right face, a face index of the top face, and a face index of the bottom face.

4. The video processing method of claim 1, wherein the plurality of projection faces comprise the full face packed at a face position with a position index, a value of a syntax element assigned to the position index indicates a face index of the top face, and a value of a syntax element assigned to any other position index indicates a face index selected from a group consisting of a face index of the left face, a face index of the front face, a face index of the back face, and a face index of the right face.

5. The video processing method of claim 1, wherein the plurality of projection faces comprise the full face packed at a face position with a position index, a value of a syntax element assigned to the position index indicates a face index of the bottom face, and a value of a syntax element assigned to any other position index indicates a face index selected from a group consisting of a face index of the left face, a face index of the front face, a face index of the back face, and a face index of the right face.

6. The video processing method of claim 1, wherein the plurality of projection faces comprise the full face packed at a face position with a position index, a value of a syntax element assigned to the position index indicates a face index of the right face, and a value of a syntax element assigned to any other position index indicates a face index selected from a group consisting of a face index of the back face, a face index of the front face, a face index of the top face, and a face index of the bottom face.

7. The video processing method of claim 1, wherein the plurality of projection faces comprise the full face packed at a face position with a position index, a value of a syntax element assigned to the position index indicates a face index of the left face, and a value of a syntax element assigned to any other position index indicates a face index selected from a group consisting of a face index of the back face, a face index of the front face, a face index of the top face, and a face index of the bottom face.

8. The video processing method of claim 1, wherein the portion of the 360-degree content of the sphere is projected onto a square face and halves of other four square faces of a cube, the plurality of projection faces packed in the hemisphere cubemap projection layout comprise the full face and four half faces, the full face is derived from the square face, and the four half faces are derived from the halves of the other four square faces connected to the square face, respectively.

9. A video processing method comprising:
receiving a bitstream; and
decoding a part of the bitstream to generate a decoded frame, comprising:
parsing a plurality of first syntax elements from the bitstream;
wherein the decoded frame is a projection-based frame that comprises a plurality of projection faces packed at a plurality of face positions with different position indexes in a hemisphere cubemap projection layout; a portion of a 360-degree content of a sphere is mapped to the plurality of projection faces via hemisphere cubemap projection; values of the plurality of first syntax elements are indicative of rotation angles of the plurality of projection faces packed at the plurality of face positions, respectively; and a portion of the values of the plurality of first syntax elements are constrained to meet a requirement of bitstream conformance, where the plurality of projection faces packed at the plurality of face positions in the hemisphere cubemap projection layout comprise four half faces, and said portion of the values of the plurality of first syntax elements comprises values indicative of rotation angles of the four half faces.

10. The video processing method of claim 9, wherein the hemisphere cubemap projection layout is a horizontally packed hemisphere cubemap layout, the plurality of projection faces comprise a half face packed at a face position with a position index, the half face is derived from a top half or a bottom half of a square face of a cube, and a value of a first syntax element assigned to the position index indicates a rotation angle selected from a group consisting of 90° and 270°.

11. The video processing method of claim 9, wherein the hemisphere cubemap projection layout is a horizontally packed hemisphere cubemap layout, the plurality of projection faces comprise a half face packed at a face position with a position index, the half face is derived from a left half or a right half of a square face of a cube, and a value of a first syntax element assigned to the position index indicates a rotation angle selected from a group consisting of 0° and 180°.

12. The video processing method of claim 9, wherein the hemisphere cubemap projection layout is a vertically packed hemisphere cubemap layout, the plurality of projection faces comprise a half face packed at a face position with a position index, the half face is derived from a left half or a right half of a square face of a cube, and a value of a first syntax element assigned to the position index indicates a rotation angle selected from a group consisting of 90° and 270°.

13. The video processing method of claim 9, wherein the hemisphere cubemap projection layout is a vertically packed hemisphere cubemap layout, the plurality of projection faces comprise a half face packed at a face position with a position index, the half face is derived from a top half or a bottom half of a square face of a cube, and a value of a first syntax element assigned to the position index indicates a rotation angle selected from a group consisting of 0° and 180°.

14. The video processing method of claim 9, wherein the hemisphere cubemap projection layout is a horizontally packed hemisphere cubemap layout; decoding the part of the bitstream to generate the decoded frame further comprises:
parsing a plurality of second syntax elements from the bitstream;
wherein values of the plurality of second syntax elements are indicative of face indexes of the plurality of projection faces packed at the plurality of face positions, respectively; the plurality of projection faces comprise a full face packed at a face position with a first position index and a plurality of half faces packed at face positions with different second position indexes; a value of a second syntax element assigned to the first position index indicates a face index selected from a group consisting of a face index of a front face and a face index of a back face; and a value of a first syntax element assigned to any of the second position indexes indicates a rotation angle selected from a group consisting of 0° and 180°.

15. The video processing method of claim 9, wherein the hemisphere cubemap projection layout is a horizontally packed hemisphere cubemap layout; decoding the part of the bitstream to generate the decoded frame further comprises:
parsing a plurality of second syntax elements from the bitstream;
wherein values of the plurality of second syntax elements are indicative of face indexes of the plurality of projection faces packed at the plurality of face positions, respectively; the plurality of projection faces comprise a full face packed at a face position with a first position index, a half face packed at a face position with a second position index, and remaining half faces packed at face positions with different third position indexes; a value of a second syntax element assigned to the first position index indicates a face index selected from a group consisting of a face index of a top face and a face index of a bottom face; a value of a second syntax element assigned to the second position index indicates a face index of a back face; a value of a first syntax element assigned to the second position index indicates a rotation angle selected from a group consisting of 0° and 180°; and a value of a first syntax element assigned to any of the third position indexes indicates a rotation angle selected from a group consisting of 90° and 270°.

16. The video processing method of claim 9, wherein the hemisphere cubemap projection layout is a horizontally packed hemisphere cubemap layout; decoding the part of the bitstream to generate the decoded frame further comprises:
parsing a plurality of second syntax elements from the bitstream;
wherein values of the plurality of second syntax elements are indicative of face indexes of the plurality of projection faces packed at the plurality of face positions, respectively; the plurality of projection faces comprise a full face packed at a face position with a first position index, a half face packed at a face position with a second position index, and remaining half faces packed at face positions with different third position indexes; a value of a second syntax element assigned to the first position index indicates a face index selected from a group consisting of a face index of a right face and a face index of a left face; a value of a second syntax element assigned to the second position index indicates a face index of a front face; a value of a first syntax element assigned to the second position index indicates a rotation angle selected from a group consisting of 0° and 180°; and a value of a first syntax element assigned to any of the third position indexes indicates a rotation angle selected from a group consisting of 90° and 270°.

17. The video processing method of claim 9, wherein the hemisphere cubemap projection layout is a vertically packed hemisphere cubemap layout; decoding the part of the bitstream to generate the decoded frame further comprises:

parsing a plurality of second syntax elements from the bitstream;

wherein values of the plurality of second syntax elements are indicative of face indexes of the plurality of projection faces packed at the plurality of face positions, respectively; the plurality of projection faces comprise a full face packed at a face position with a first position index and a plurality of half faces packed at face positions with different second position indexes; a value of a second syntax element assigned to the first position index indicates a face index selected from a group consisting of a face index of a front face and a face index of a back face; and a value of a first syntax element assigned to any of the second position indexes indicates a rotation angle selected from a group consisting of 90° and 270°.

18. The video processing method of claim 9, wherein the hemisphere cubemap projection layout is a vertically packed hemisphere cubemap layout; decoding the part of the bitstream to generate the decoded frame further comprises:

parsing a plurality of second syntax elements from the bitstream;

wherein values of the plurality of second syntax elements are indicative of face indexes of the plurality of projection faces packed at the plurality of face positions, respectively; the plurality of projection faces comprise a full face packed at a face position with a first position index, a half face packed at a face position with a second position index, and remaining half faces packed at face positions with different third position indexes; a value of a second syntax element assigned to the first position index indicates a face index selected from a group consisting of a face index of a top face and a face index of a bottom face; a value of a second syntax element assigned to the second position index indicates a face index of a back face; a value of a first syntax element assigned to the second position index indicates a rotation angle selected from a group consisting of 90° and 270°; and a value of a first syntax element assigned to any of the third position indexes indicates a rotation angle selected from a group consisting of 0° and 180°.

19. The video processing method of claim 9, wherein the hemisphere cubemap projection layout is a vertically packed hemisphere cubemap layout; decoding the part of the bitstream to generate the decoded frame further comprises:

parsing a plurality of second syntax elements from the bitstream;

wherein values of the plurality of second syntax elements are indicative of face indexes of the plurality of projection faces packed at the plurality of face positions, respectively; the plurality of projection faces comprise a full face packed at a face position with a first position index, a half face packed at a face position with a second position index, and remaining half faces packed at face positions with different third position indexes; a value of a second syntax element assigned to the first position index indicates a face index selected from a group consisting of a face index of a right face and a face index of a left face; a value of a second syntax element assigned to the second position index indicates a face index of a front face; a value of a first syntax element assigned to the second position index indicates a rotation angle selected from a group consisting of 90° and 270°; and a value of a first syntax element assigned to any of the third position indexes indicates a rotation angle selected from a group consisting of 0° and 180°.

20. A video processing apparatus comprising:

a decoding circuit, arranged to receive a bitstream, and decode a part of the bitstream to generate a decoded frame, wherein the decoding circuit parses a plurality of first syntax elements and a plurality of second syntax elements from the bitstream;

wherein the decoded frame is a projection-based frame that comprises a plurality of projection faces packed at a plurality of face positions with different position indexes in a hemisphere cubemap projection layout; a portion of a 360-degree content of a sphere is mapped to the plurality of projection faces via hemisphere cubemap projection; the plurality of projection faces packed at the plurality of face positions in the hemisphere cubemap projection layout comprise a full face and four half faces; values of the plurality of second syntax elements are indicative of face indexes of the plurality of projection faces packed at the plurality of face positions, respectively, and are constrained to meet a requirement of bitstream conformance; constraint applied to the values of the plurality of syntax elements in response to the full face set by a first face which is one of a top face, a bottom face, a front face, a back face, a left face and a right face is different from constraint applied to the values of the plurality of syntax elements in response to the full face set by a second face which is adjacent to the first face; values of the plurality of first syntax elements are indicative of rotation angles of the plurality of projection faces packed at the plurality of face positions, respectively; and a portion of the values of the plurality of first syntax elements are constrained to meet the requirement of bitstream conformance, where said portion of the values of the plurality of first syntax elements comprises values indicative of rotation angles of the four half faces.

\* \* \* \* \*